US012424804B2

(12) United States Patent
Lechner et al.

(10) Patent No.: US 12,424,804 B2
(45) Date of Patent: Sep. 23, 2025

(54) CONNECTOR FRAME, TERMINAL CONNECTOR FRAME, TERMINAL CONNECTOR AND CONNECTOR ASSEMBLY

(71) Applicant: Knorr-Bremse Systeme Fuer Nutzfahrzeuge GmbH, Munich (DE)

(72) Inventors: Klaus Lechner, Pretzfeld (DE); Sagar Kumbhar, Pune (IN); Himanshu Kudalkar, Pune (IN); Swanand Deshpande, Pune (IN); Pankaj Ingale, Pune (IN)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 399 days.

(21) Appl. No.: 18/048,544

(22) Filed: Oct. 21, 2022

(65) Prior Publication Data

US 2023/0155331 A1 May 18, 2023

(30) Foreign Application Priority Data

Nov. 17, 2021 (EP) .................................... 21208779

(51) Int. Cl.
*H01R 24/00* (2011.01)
*H01R 13/504* (2006.01)
*H01R 13/52* (2006.01)

(52) U.S. Cl.
CPC ........... *H01R 24/00* (2013.01); *H01R 13/504* (2013.01); *H01R 13/5202* (2013.01)

(58) Field of Classification Search
None
See application file for complete search history.

(56) References Cited

U.S. PATENT DOCUMENTS

| | | | | |
|---|---|---|---|---|
| 6,254,428 B1 * | 7/2001 | Murakami | H01R 13/5219 | 439/588 |
| 8,962,999 B2 * | 2/2015 | John | H01R 12/7023 | 338/50 |
| 2003/0162421 A1 * | 8/2003 | Pratt | H01R 13/6658 | 439/76.1 |
| 2008/0057758 A1 * | 3/2008 | Walter | H01R 13/5219 | 439/108 |
| 2010/0317239 A1 * | 12/2010 | Achammer | H01R 12/7064 | 29/832 |

FOREIGN PATENT DOCUMENTS

| | | | |
|---|---|---|---|
| CN | 104472027 | A | 3/2015 |
| EP | 1193808 | A2 | 4/2002 |
| JP | 2014067550 | A | 4/2014 |
| WO | 2008005945 | A2 | 1/2008 |

* cited by examiner

*Primary Examiner* — Oscar C Jimenez
(74) *Attorney, Agent, or Firm* — NORTON ROSE FULBRIGHT US LLP

(57) ABSTRACT

A connector frame for a connector assembly for an electric connection of a device in a connector-to-counter-connector configuration, including: at least one connector frame opening, in which the connector frame opening is configured to receive at least one terminal connector frame and/or at least one terminal connector by a form-fit and/or force-fit connection.

9 Claims, 2 Drawing Sheets

CONNECTOR FRAME, TERMINAL CONNECTOR FRAME, TERMINAL CONNECTOR AND CONNECTOR ASSEMBLY

RELATED APPLICATION INFORMATION

The present application claims priority to and the benefit of European patent application no. 21208779.5, which was filed in Europe on Nov. 17, 2021, the disclosure of which is incorporated herein by reference.

FIELD OF THE INVENTION

The present invention relates to a connector frame, a terminal connector frame, and a terminal connector for a connector assembly for an electric connection of a device in a connector-to-counter-connector configuration as well as a respective connector assembly.

BACKGROUND INFORMATION

Connector assemblies for an electric connection of a device in a connector-to-counter-connector configuration are, for example, used to provide an electrical connection between contacts of a printed circuit board and HDSCS connectors as counter-connectors. As different types of HDSCS, other counter-connectors or combinations thereof are used in different applications with different printed circuit boards as devices, the efforts to manufacture and handle the individual variations are significant.

For example, multiple connector strips corresponding to different counter-connectors or variations have to be handled and assembled on a respective device. This leads to more space consumption and increased requirements with respect to an appropriate dimensional alignment with counter assembly parts. Further, the multiple connector strips and dimensional constraints may result in an arrangement, which is not ergonomic for connecting a respective counter-connector.

SUMMARY OF THE INVENTION

In view of the above, it is an object of the present invention to provide a connector frame, a terminal connector frame, and a terminal connector for a connector assembly for an electric connection of a device in a connector-to-counter-connector configuration as well as a respective connector assembly allowing a plurality of counter-connectors to be flexibly electrically connected to the connector assembly.

The object may be solved by a connector frame according to the description herein, a terminal connector frame according to the description herein, a terminal connector according to the description herein, and a connector assembly according to the description herein. Further aspects of the present invention are subject to the further descriptions herein.

According to the present invention, a connector frame for a connector assembly for an electric connection of a device in a connector-to-counter-connector configuration, comprises at least one connector frame opening, wherein the connector frame opening is configured to receive at least one terminal connector frame and/or at least one terminal connector by a form-fit and/or force-fit connection.

With the connector frame comprising at least one connector frame opening to receive at least one terminal connector frame and/or at least one terminal connector by a form-fit and/or force-fit connection, the configuration of terminal connectors or at least terminal connector frames may be adapted easily by populating and depopulating the connector frame according to the given application in an easy manner.

Accordingly, a single adaptable connector strip as a connector assembly or as part of a connector assembly may be provided by at least one connector frame comprising at least one terminal connector frame and/or at least one terminal connector received in the at least one connector frame opening. As will be described later, the at least one terminal connector frame is a frame member to receive a terminal connector to be positioned in the connector frame. Alternatively, the at least one terminal connector may be configured to be directly received in the connector frame.

To provide a form-fit and/or force fit connection of the at least one terminal connector frame and/or the at least one terminal connector with the connector frame and the at least one connector frame opening, respectively, the at least one terminal connector frame and/or the at least one terminal connector may comprise form-fit and/or force-fit structure and/or arrangement, such as snap-fit members, snap-fit member receiving portions, through holes for fixing screws or the like. Analogously, the connector frame comprises corresponding form-fit and/or force-fit structure and/or arrangement at or near the at least connector frame opening. In addition, the at least one terminal connector frame and/or the at least one terminal connector may comprise further form-fit and/or force-fit structure and/or arrangement to connect terminal connector frames and/or the terminal connectors facing each other in a longitudinal direction when assembled. The longitudinal direction refers to the largest extension of the connector frame opening in the frame plane as a length of the connector frame opening.

In some embodiments, the connector frame comprises at least two connector frame openings, each of which providing the largest extension of the opening in the frame plane as length. The at least two connector frame openings are arranged in parallel to each other with their respective lengths at least partially facing each other.

Accordingly, the connector frame comprises at least two rows of connector frame openings with each row extending in the longitudinal direction. At least one of the at least two connector frame openings does not extend beyond another one of the at least two connector frame openings in the longitudinal direction. Accordingly, the most compact arrangement in the longitudinal direction may be provided for the given lengths of the at least two connector frame openings. In particular, the at least two connector frame openings are configured to provide similar lengths to distribute the terminal connector frames and/or the terminal connectors in an almost rectangular arrangement. For example, the connector frame may be intended to allow the accommodation of seven partially different terminal connectors to receive corresponding HDSCS counter-connectors, e.g. one 7-pin, one 4-pin, one 3-pin, two inline 4-pin and two 6-pin HDSCS counter-connectors. In such configuration, the connector terminal frame may provide a first connector frame opening to receive the terminal connectors to be connectable to the 7-pin, the two inline 4-pin and the 3-pin HDSCS counter-connectors adjacent to each other in the longitudinal direction of the first connector frame opening as a first terminal connector arrangement. A second connector frame opening may be configured to receive the connector terminals to be connectable to the two 6-pin and the 4-pin HDSCS counter-connectors adjacent to each other in the longitudinal direction of the second connector frame opening as a second terminal connector arrangement.

The first and second terminal connector arrangement provide a similar space consumption in the longitudinal direction. Accordingly, arranging the first connector frame opening and the second connector frame opening as two rows with the connector frame opening having a length equal or smaller than the other connector frame opening not extending beyond the other connector frame opening in the longitudinal direction supports a compact configuration in such direction.

For example, such configuration may allow to provide a connector frame or a connector strip, respectively, for accommodating the seven terminal connectors within an overall dimension of 104 mm in the longitudinal direction and 95.5 mm in a direction perpendicular to the longitudinal direction in the frame plane. The frame plane extends in plane to face the device and the device contact portion when assembled to the device.

Alternatively or in addition, at least two rows of terminal connector frames and/or terminal connectors may be provided in at least one connector frame opening. In such configuration the terminal connector frames and/or the terminal connectors may also comprise form-fit and/or force-fit structure and/or arrangement to connect terminal connector frames and/or the terminal connectors facing each other in a direction perpendicular to the longitudinal direction in the frame plane. The same principles as described for at least two connector frame openings as two rows also apply for the at least two rows of terminal connector frames and/or terminal connectors within one connector frame opening.

With two rows of connector frames and/or two rows of terminal connector frames and/or terminal connectors, each terminal connector frame and/or terminal connector may be accessible from at least one side by requiring less space in the longitudinal direction in comparison to an arrangement in one row only.

In some embodiments, the connector frame comprises at least one oblong hole configured such that the connector frame is attachable to the device and such that a relative position of the connector frame is adjustable with respect to the device.

The at least one oblong hole may allow to compensate for tolerances when assembling the connector frame as connector strip to the device directly or to a connector strip as part thereof to be attached to the device indirectly. Alternatively or in addition, the at least one oblong hole may be configured to achieve different relative positions of the connector frame with respect to the device to allow terminal connectors and electric terminals, respectively, to be connectable to different contact portions of the device.

The at least one oblong hole may be arranged at an outer circumference, i.e. in a portion near an outer edge, of the connector frame to support accessibility during assembling or disassembling. For example, the connector frame may be of a rectangular shape in the frame plane and may comprise four oblong holes in each corner. Alternatively or in addition, oblong holes may be provided near the outer edge of the connector frame in an intermediate or central position between two subsequent corners.

In some embodiments, the connector frame comprises at least one pressure relief member.

The pressure relief member may be a burst disc, for example a burst disc of 1.5 mm in thickness and 7 mm in diameter. The burst disc may be press fitted inside a hole in the connector frame, for example with a hole diameter of 5.95 mm. The material of the burst disc may be 50 VMQ 570. The relief member may be configured to break open or burst off if the pressure inside the connector exceeds a predetermined pressure increase threshold, e.g. an increase of more than 2.5 bars. The change in pressure inside the connector may be due to temperature changes caused by heat emitted by electronic components on a printed circuit board as device within the connector.

In some embodiments, the connector frame comprises at least one sealing member enclosing the at least one connector frame opening and/or the at least one pressure relief member.

The at least one sealing member may be arranged near the outer circumference of the connector frame to be in contact with the device when the connector frame is assembled thereto. Accordingly, components within a space between the device and the connector frame enclosed by the at least one sealing member may be protected from external influences. Alternatively or in addition, the at least one sealing member or a further sealing member, respectively, may be arranged in the frame plane one a side facing away from the device when the connector frame is assembled thereto. The sealing member may thereby provide a sealing with a housing or other components being arranged on the side of the connector frame facing away from the device. Other components within the housing or next to the other components may therefore be protected.

In a further aspect, the present invention relates to a terminal connector frame for a connector assembly for an electric connection of a device in a connector-to-counter-connector configuration, configured to be received by a connector frame, which may be a connector frame as previously described, wherein the terminal connector frame comprises at least one terminal connector and/or at least one terminal connector frame opening configured to receive at least one terminal connector by a form-fit and/or force-fit connection.

The at least one terminal connector comprised by the terminal connector frame may be integrally formed with the terminal connector frame, e.g. by being molded as an integral component. Alternatively, the at least one terminal connector may be receivable by the terminal connector frame proving a terminal connector frame opening. The terminal connector frame opening is configured to receive the at least one terminal connector by a form-fit and/or force-fit connection. For the form-fit and/or force-fit connection, the same principle as for the form-fit and/or force-fit connection described with respect to the connector frame opening may apply.

The terminal connector frame may be configured to close the connector frame opening at least in a direction perpendicular to the longitudinal direction of the connector frame opening. In some configurations, the terminal connector frame may also be configured to close the connector frame opening in the longitudinal direction. In such configuration, the terminal connector frame may comprise more than one terminal connectors and/or more than one terminal connector frame openings. Instead of closing the connector frame opening in the longitudinal direction by one terminal connector frame, the connector frame opening may be closable by a plurality of terminal connector frames received adjacent to each other in the longitudinal direction. Closing the at least one connector frame opening by the at least one terminal connector frame or a plurality of terminal connector frames allows protection of components within the space between the device and the connector frame or connector strip, respectively, when the connector frame is assembled to the device. Instead of closing the at least one connector frame opening by the at least one terminal connector frame or a plurality of terminal connector frames, the at least one connector frame opening or at least a portion thereof not occupied by a respective terminal connector frame may be closed by a filler plate or filler plug. Such filler plate or filler plug may be configured like the terminal connector frame without a terminal connector but with a closed surface. Alternatively, the filler plate or filler plug may be configured to close the at least one terminal connector frame opening. The filler plate or plug may be configured to be removable from the connector frame opening or the terminal connector frame opening to allow to be replaced by a terminal connector frame or a terminal connector.

In some embodiments, the terminal connector frame comprises at least one terminal assembly to provide at least one terminal connector with at least one electric terminal configured to electrically connect at least one counter-connector with a device in a connector-to-counter-connector configuration by a device contact terminal portion of the at least one electric terminal.

Accordingly, the at least one terminal assembly comprising at least one electric terminal may be assembled to the device by assembling the connector frame to the device with the terminal connector frame comprised thereby. The connector frame, the terminal connector frame and the terminal assembly, respectively, are configured such that the device contact terminal portion contacts a corresponding device contact portion of the device when the connector frame is assembled to the device. Alternatively or in addition, the connector frame, the terminal connector frame and the terminal assembly, respectively, are configured to allow the position of the device contact terminal portion to be adapted. In such configuration, tolerances may compensated and/or different contact positions may be achievable.

The at least one terminal assembly may comprise at least one mold portion with the at least one electric terminal mold in the mold portion.

The mold portion may be attached to the terminal connector frame or integrally formed therewith. Accordingly, the at least one electric contact arranged in a predetermined position within the mold portion may also provide a predetermined position with respect to the terminal connector frame. In some configurations, the terminal assembly may provide a plurality of electric terminals. With the plurality of electric terminals being mold in the mold portion, the electric terminals may be already provided in predetermined relative positions to each other to ease a later assembling.

In some embodiments, the device contact terminal portion of the at least one electric terminal of the at least one terminal assembly is an exposed end of the at least one terminal assembly configured to be in contact with an electric contact of the device in an electric connection of a device in a connector-to-counter-connector configuration comprising at least two turning points to deflect the extension of the electric terminal at least once from a main direction, in which the electric terminal extends in a contact direction.

The device contact terminal portion is intended to be positioned in electric contact with a device contact, for example, an electric contact of a printed circuit board as an exemplary device. The counter-connector terminal portion as the other end of the electric terminal is intended to be positioned in electric contact with a counter-connector contact, for example, by being received in a socket of a HDSCS connector as exemplary counter-connector. The main direction, in which the electric terminal extends from the device contact terminal portion to the counter-connector terminal portion, represents a virtual direct connection, i.e. a straight line, between the device contact terminal portion and the counter-connector terminal portion. The electric terminal does not necessarily have to physically extend at least partially along the main direction. In other words, the electric terminal may but not have to extend physically at least partially along the main direction but the extension of the electric terminal is oriented in such main direction.

The device contact terminal portion of the at least one electric terminal of the at least one terminal assembly being an exposed end of the at least one terminal assembly may allow at least partial compensation of a thermal expansion of the electric terminal and/or at least partial compensation of tolerances in the main direction. Specifically, according to the modular configuration when assembling the terminal assembly to the terminal connector to be connected to the terminal connector frame or the connector frame, the device contact terminal portion allowing compensation of tolerances may provide a significant advantage.

Due to the at least two turning points the electric terminal at least once extends in a direction different from the main direction. A thermal expansion of the electric terminal may be at least partially compensated, for example, by the at least two turning points being displaced in the event of a thermal expansion. For example, the electric terminal end may be provided in a z-shape with the electric terminal extending in the device contact terminal portion in a first direction with a first turning point deflecting the electric terminal, for example, by 90° in a second direction. At a second turning point of the device contact terminal portion, the electric terminal is again deflected, for example, by 90° to further extend to the counter-connector terminal portion in the first direction. With the first direction being mainly relevant with respect to the electric connection of a device in a connector-to-counter-connector configuration and the device contact terminal portion and the counter-connector terminal portion being clamped between the device and the counter-connector in the main direction when assembled to the device, the first turning point may be displaced towards the counter-connector terminal portion and the second turning point is displaced towards the device contact terminal portion. The electric terminal portion between the first turning point and second turning point is thereby moved to be inclined with respect the former angles of 90°. Tolerances in the main direction may be compensated by the device contact terminal portion being configured to provide an exposed length in the main direction corresponding to a predetermined maximum distance to be bridged by the device contact terminal portion to contact the device when assembled. Even if the distance is shorter due to tolerances or the like, the at least two turning points to deflect the extension of the electric terminal allow a compression of the device contact terminal portion.

In some embodiments, the device contact terminal portion is at least partially flexible in the main direction. Accordingly, a compensation of a thermal expansion of the electric terminal and/or tolerances may therefore, alternatively or in addition to the displacement of at least one of the at least two turning points, be provided by an elastic deformation of at least a part of the device contact portion. The flexibility to allow a respective elastic deformation may be provided by the elastic properties according to material selection for the electric terminal or at least the respective portion of the device contact terminal portion, the dimensions of the respective portion of the device contact terminal portion and/or the shape of the respective portion of the device contact terminal portion. For example, the respective portion of the device contact terminal portion may be provided as a flexure bearing, flexible in the main direction. The ability for an elastic deformation may correspond at least to the expected thermal expansion and/or expected tolerances according to a given application in terms of expected temperatures and thermal expansion coefficients and/or expected tolerances to be considered.

Turning back to the previous example of a z-shaped electric terminal, the electric terminal portion between the first turning point and the second turning point may be configured as thin stripe to elastically flex in the main direction with respect to the first turning point and/or the second turning point.

In some embodiments, the device contact terminal portion is a meander portion comprising at least one meander deflecting the extension of the electric terminal away from and back towards the main direction. Such meander portion in configured to operate like a spring member to be compressed in the main direction due to thermal expansion of the electric terminal and/or tolerances when the device contact terminal portion and the counter-connector terminal portion are clamped between the device and the counter-connector in the main direction. With a plurality of meanders subsequent in the main direction, the ability to compensate for thermal expansions and/or tolerances may be further enhanced. For example, a plurality of subsequent meanders may increase the ability to compensate for thermal expansions and/or tolerances without increasing the required radial space with respect to the main direction in comparison to one meander. Alternatively or in addition, a plurality of subsequent meanders may require less flexibility of each meander in comparison to one single meander, which may allow another material selection and/or other dimensions and/or other shapes.

In some embodiments, the device contact terminal portion and the counter-connector terminal portion are on the same axis extending in parallel to the main direction, which may be a symmetry axis of the at least one meander. Accordingly, the electric terminal may be compressed by a thermal expansion of the electric terminal and/or by tolerances in the main direction when the device contact terminal portion and the counter-connector terminal portion are clamped between the device and the counter-connector in the main direction. In other words, the electric terminal is less prone to deflect from the main direction when being compressed. Consequently, the electric terminal remains a sufficient stiffness against an excessive compression, which may otherwise result in plastic deformation.

In a further aspect, the present invention relates to a terminal connector for a connector frame, which may be a connector frame as previously described, and/or a terminal connector frame, which may be for a terminal connector frame as previously described, wherein the terminal connector comprises at least one connection member to connect the terminal connector to the connector frame or the terminal connector frame by a form-fit and/or force-fit connection.

The terminal connector may be provided as a socket to receive a corresponding counter-connector. The at least one connection member to connect the terminal connector to the connector frame or the terminal connector frame by a form-fit and/or force-fit connection may be a snap-fit member or the like as already addressed with respect to principles of a form-fit and/or force fit connection. The at least one connection member may be configured to allow the terminal connector to be removable, which may be in a non-destructive manner, to allow replacement of the terminal connector.

In some embodiments, the terminal connector comprises the at least one terminal assembly as previously described.

The at least one electric terminal is thereby already provided by the terminal connector. The at least one electric terminal may therefore be attached to the terminal connector via the mold portion of the terminal assembly. The terminal connector may comprise at least one through hole, to let the at least one electric terminal pass there through. Alternatively, the mold portion is formed by the terminal connector. The terminal connector comprising the at least one terminal assembly may provide a configuration with the counter-connector terminal portion being exposed from one side of the terminal connector to be connected to a counter-connector and the device contact terminal portion being exposed from the opposed other side of the terminal connector to be connected to the device.

In a further aspect, the present invention relates to a connector assembly for an electric connection of a device in a connector-to-counter-connector configuration, comprising at least one connector frame, which may be a connector frame as previously described, with at least one terminal connector frame, which may be with at least one terminal connector frame as previously described, and/or at least one terminal connector, which may be at least one terminal connector as previously described, received in a connector frame opening by a form-fit and/or force-fit connection.

In accordance with the previous description of the connector frame, the terminal connector frame and the terminal connector, the modular configuration of a respective connector assembly allows a flexible assembling of different terminal connector configurations and may provide less space consumption.

The connector assembly may comprise the device to be electrically connected to a counter-connector, and wherein the connector frame is attached to the device, which may be by at least one screw passing through the at least one oblong hole of the connector frame and the device, with at least one device contact terminal portion of an electric terminal provided by the at least one terminal connector or the at least one terminal connector frame being in contact with an electric contact of the device by such attachment.

Accordingly, the connector assembly with the device in electric contact with the at least one device contact terminal portion of the at least one electric terminal may be provided as pre-assembled module for a given application.

The device may comprise several electric contact configurations in a device portion assigned to the at least one terminal connector or the at least one terminal connector frame to allow an electrical connection of different terminal assemblies in such device portion.

As the connector assembly allows a flexible configuration of terminal connectors and electric terminals, respectively, the several electric contact configurations of the device correspond thereto. For example, a device portion of the device allows to be electrically connected to a terminal assembly to be connected to a 6-pin HDSCS counter-connector as well as to a 4-pin HDSCS counter-connector by an electric contact pattern of the device allowing both.

Further advantages, aspects and details of the invention are subject to the claims, the following description of the particular embodiments applying the principles of the invention, and drawings.

DETAILED DESCRIPTION

Figure 1:
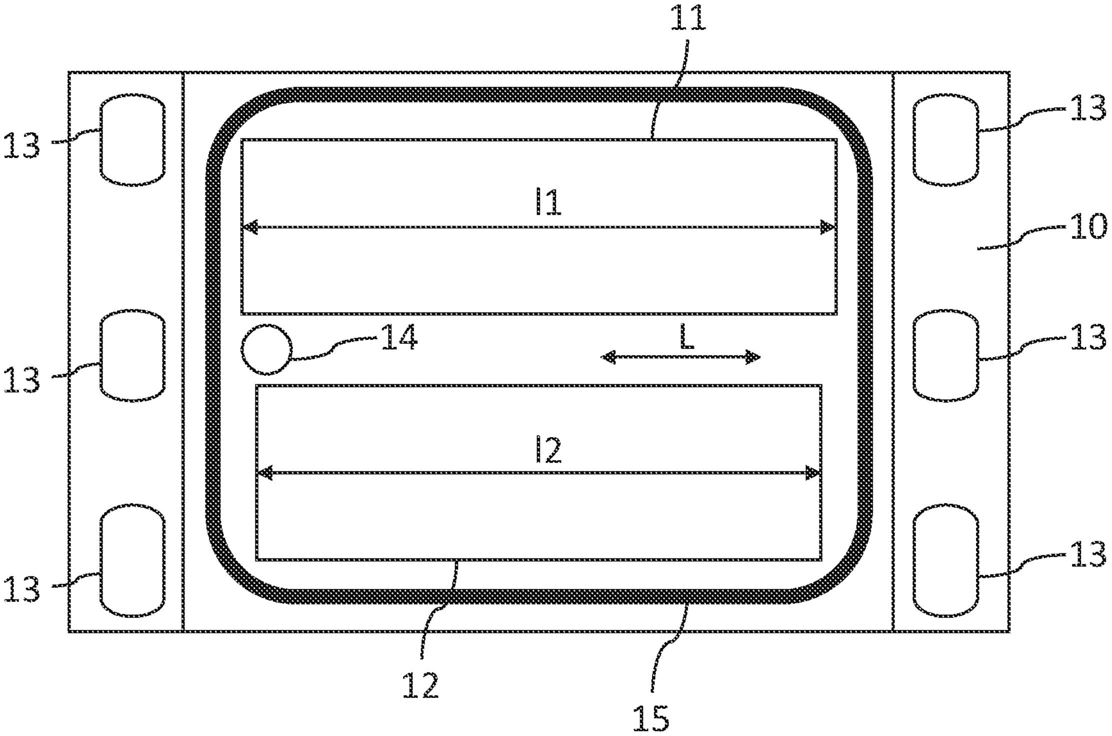
FIG. 1 shows a schematic front view of a connector frame according to an exemplary embodiment of the present invention.

FIG. 1 shows a schematic front view of a connector frame 10 according to an exemplary embodiment of the present invention. The connector frame 10 comprises a first connector frame opening 11 and a second connector frame opening 12. Each of the first connector frame opening 11 and the second connector frame opening 12 provides a substantially rectangular shape with a length l1, l2 as the largest extension in the frame plane. The frame plane is the plane comprising the first connector frame opening 11 and the second connector frame opening 12 and intended to face a device 80 (FIG. 3) when assembled to such device. The first connector frame opening 11 and the second connector frame opening 12 are arranged to form two rows with the lengths l1, l2 facing each other. In the exemplary embodiment, the length l2 of the second connector frame opening 12 is slightly smaller than the length l1 of the first connector frame opening 11 and arranged to not extend beyond the first connector frame opening 11 in a longitudinal direction L. Accordingly, the second connector frame opening 12 does not require further space in the longitudinal direction L in addition to the space in the longitudinal direction L already required for the first connector frame opening 11. Therefore, the connector frame 10 is provided in a compact configuration with respect to its dimensions in the longitudinal direction L. In alternative embodiments, the first and second connector frame openings 11, 12 may be arranged differently or only one connector frame opening or more than two connector frame openings may be comprised by the connector frame 10 according to specific application constraints. The same applies for the shape of the connector frame 10, which is of a substantially rectangular shape to support a compact configuration in the given exemplary embodiment, but may be of a different shape in alternative embodiments to account for different application requirements.

The connector frame 10 further comprises oblong holes 13 disposed at two outer periphery portions of the connector frame 10 opposed two each other in the longitudinal direction L. Here, each of the outer periphery portions comprises three oblong holes 13 arranged in a row perpendicular to the longitudinal direction L with the outer oblong holes 13 in such row are disposed in corner portions of the connector frame 10. In alternative embodiments, the number and arrangement of the oblong holes 13 and/or rows may be different. For example, only one oblong hole 13 or only one oblong hole 13 per row or only one row at all may be comprised by the connector frame 10. As another variant, the connector frame may only provide oblong holes 13 in the corner portions. Further, the rows of oblong holes 13 may extend alternatively or in addition in the longitudinal direction L. The oblong holes 13 are configured to allow adaption of the relative position of the connector frame 10 when assembling the connector frame 10 to a counter-part, here to the device 80 as described later. The adaption of the relative position allows to compensate for tolerances and/or to assemble the connector frame 10 to different devices and/or in different positions.

Figure 3:
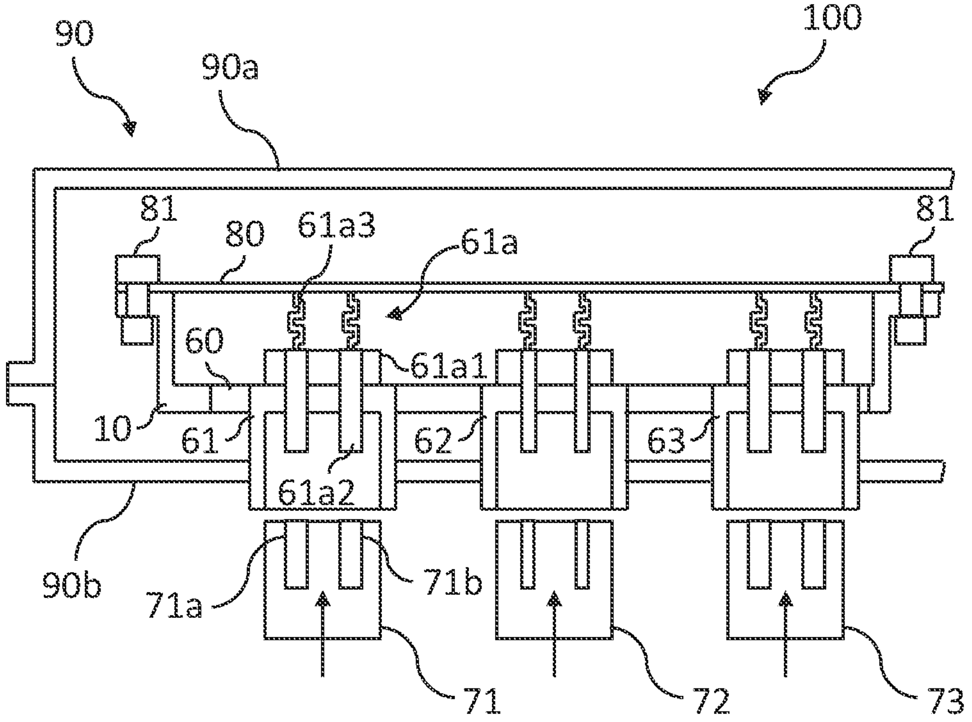
FIG. 3 shows a schematic cross-sectional view of an exemplary embodiment of a connector assembly with a connector strip assembly according to FIG. 2.

Additionally, the connector frame 10 comprises a pressure relief member 14. The pressure relief member 14 is a safety feature configured to break open when high pressure is applied. In the exemplary embodiment, the pressure relief member 14 is a pressure relief burst disc. Here, the pressure relief member 14 is arranged between the first connector frame opening 11 and the second connector frame opening 12. Here, the pressure relief member 14 is a burst disc with 1.5 mm in thickness and 7 mm in diameter. The pressure relief member 14 is press fitted inside a corresponding hole in the connector frame 10 with a diameter of 5.95 mm. This pressure relief member 14 is of the material 50 VMQ 570. The pressure relief member 14 will break open or burst off if the pressure inside a connector 100 (FIG. 3) increases more than 2.5 bars. The change in pressure inside the connector 100 may be due to temperature changes caused by heat emitted by electronic components on the printed circuit board as a device 80 (FIG. 3).

The connector frame 10 further comprises a sealing member 15 enclosing the first connector frame opening 11, the second connector frame opening 12 and the pressure relief member 14. The sealing member 15 is configured to be pressed against an abutment portion of a counter-part, e.g. a housing of another component, to seal an area within the enclosure by the sealing member 15 from an outside thereof and vice versa. In alternative embodiments, a plurality of sealing members may be provided to allow an individual enclosure of the first connector frame opening 11, the second connector frame opening 12 and/or the pressure relief member 14 or combinations thereof.

Figure 2:
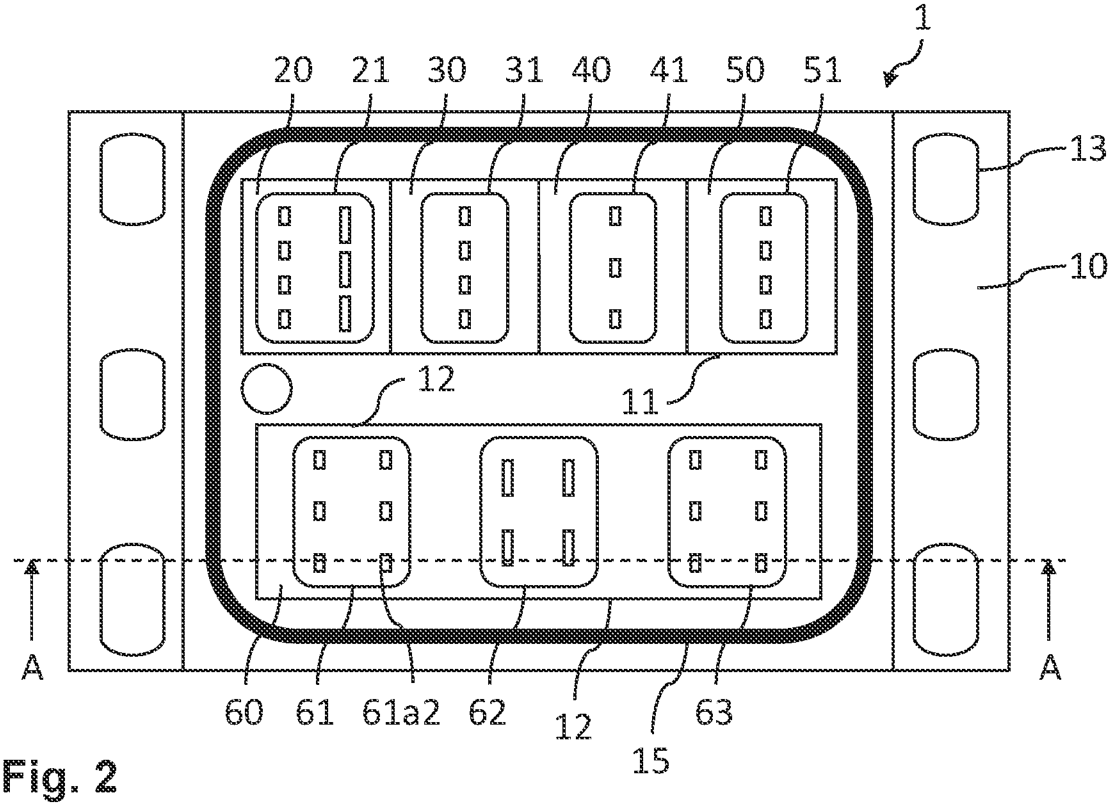
FIG. 2 shows a schematic front view of a connector strip assembly comprising a connector frame according to FIG. 1, exemplary terminal connector frames and terminal connectors according to an exemplary embodiment of the present invention.

FIG. 2 shows a schematic front view of a connector strip assembly 1 comprising a connector frame 10 according to FIG. 1, exemplary terminal connector frames 20, 30, 40, 50, 60 and terminal connectors 21, 31, 41, 51, 61, 62, 63 according to an exemplary embodiment of the present invention.

The terminal connector frames 20, 30, 40, 50 are accommodated in the first connector frame opening 11 in a row in the longitudinal direction L by snap-fits (not shown) to be received by corresponding recesses (not shown) of the connector frame 10 in the periphery of the first connector frame opening 11 to form a form-fit connection. Similarly, the terminal connector frame 60 is accommodated in the second connector frame opening 12 by a form-fit connection. The form-fit connection members of the terminal connector frames 20, 30, 40, 50, 60 are configured to correspond to each other to allow the terminal connector frames 20, 30, 40, 50, 60 to be arranged in an exchanged order or in another connector frame. Therefore, also the first connector frame opening 11 and the second connector frame opening 12 comprise corresponding form-fit members, here recesses, and the same dimension in a direction perpendicular to the longitudinal direction L to allow such different arrangements. Further, the dimensions of the terminal connector frames 20, 30, 40, 50 are the same in the longitudinal direction L. In alternative embodiments, the terminal connector frames 20, 30, 40, 50, 60 and/or the first connector frame opening 11 and second connector frame opening 12 may provide at least partially different connection members and/or dimensions to prevent at least one of the exemplary terminal connector frames 20, 30, 40, 50, 60 to be arranged in any position. In other embodiments, the connection members may alternatively or in addition form a force-fit connection. The described configuration may achieve better tolerances of connector pins at a printed circuit board side for soldering.

In other embodiments, the terminal connector frames 20, 30, 40, 50, 60 and terminal connectors 21, 31, 41, 51 accommodated in the first connector frame opening 11 in a row in the longitudinal direction L may be further secured in the connector frame 10 by over molding. Similarly, the terminal connector frame 60 accommodated in the second connector frame opening 12 by the form-fit connection may be further secured by over molding.

Each of the terminal connector frames 20, 30, 40, 50 accommodated in the first connector frame opening 11 comprises one terminal connector frame opening (not shown as occupied by the and terminal connectors 21, 31, 41, 51) to receive a respective one of the terminal connectors 21, 31, 41, 51 by a form-fit connection as described with respect to the form-fit connection of the terminal connector frames 20, 30, 40, 50, 60 to the connector frame openings 11, 12. In the exemplary embodiment, a 7-pin terminal connector 21 is received in the terminal connector frame opening of the terminal connector frame 20, inline 4-pin terminal connectors 31 and 51, respectively, are received in the terminal connector frame openings of the terminal connector frames 30 and 50, respectively, and a 3-pin terminal connector 41 is received in the terminal connector frame opening of the terminal connector frame 40. As the terminal connectors 31, 41, 51 are substantially of the same size with only differing in the number of pins, the terminal frame openings of the terminal connector frames 30, 40, 50 are configured the same, to allow to arrange the terminal connectors 31, 41, 51 in a different order without necessarily exchanging the terminal connector frames 30, 40, 50. In alternative embodiments, the terminal connector frame openings of the terminal connector frames 30, 40, 50 may be configured to only receive terminal connectors with the same pin configuration. In the present embodiment, the terminal connector frames 20, 30, 40, 50 connected to the connector frame 10 close the first connector frame opening 11. In alternative embodiments, when a connector frame opening is not closed by respective terminal connector frames for a given application, respective gaps in such connector frame opening may be closed by filler plates or filler plugs.

The second connector frame opening 12 accommodates the terminal connector frame 60 with three terminal connector frame openings to receive the terminal connectors 61, 62, 63. In alternative embodiments, the number of terminal connector frame openings may be different and/or the second terminal connector frame 12 may accommodate the terminal connectors 61, 62, 63 or combinations thereof by more than one terminal connector frame. In the present embodiment, the terminal connector frame 60 accommodates two 6-pin terminal connectors 61, 63 and a 4-pin terminal connector 62.

Each of the terminal connectors 21, 31, 41, 51, 61, 62, 63 comprises electric terminals corresponding to the number of pins represented by the rectangles within each of the terminal connectors 21, 31, 41, 51, 61, 62, 63. In FIG. 2, an exemplary electric terminal 61*a*2 is indicated.

FIG. 3 shows a schematic cross-sectional view of an exemplary embodiment of a connector assembly 100 with a connector strip assembly 1 according to FIG. 2. The cross-sectional view corresponds to a cross-section as indicated by the dotted line A-A in FIG. 2, when the connector strip 1 is assembled to the device 80 by screws 81 extending through the oblong holes 13 and the device 80. The connector assembly 100 further comprises a housing 90 with a top cover 90*a* and a connector housing 90*b* with openings for the terminal connectors 21, 31, 41, 51, 61, 62, 63 (with terminal connectors 21, 31, 41, 51 not shown according to the selected cross-sectional view) to be connected with counter-connectors 71, 72, 73.

An electric connection of the terminal connectors 21, 31, 41, 51, 61, 62, 63 will be described with respect to the terminal connector 61. The description is also applicable for the other terminal connectors 21, 31, 41, 51, 62, 63. The terminal connector 61 comprises a terminal assembly 61*a* with electric terminals 61*a*2 mold in a mold portion 61*a*1. The electric terminals 61*a*2 extend from a counter-connector terminal portion to a device contact terminal portion 61*a*3 in a main direction or contact direction, respectively. The counter-connector terminal portions of respective electric terminals 61*a*2 are exposed from the terminal connector 61 in a direction towards a counter connector 71 to be connected thereto. The counter-connector terminal end portions are to be received in respective counter-connector sockets 71*a*, 71*b*. In alternative embodiments, the counter-connector terminal portions may be configured as sockets with the counter-connector 71 providing exposed electric terminals to be received by such sockets. The device contact terminal portion 61*a*3 of each electric terminal 61*a*2 is exposed from the mold portion 61*a*1 and extends in an opposite direction from the terminal connector 61 with respect to the counter-connector terminal portion. When the connector strip assembly is assembled to the device 80 by attaching the connector frame 10 to the device 80 via the screws 81, the device contact terminal portions are in contact with respective device contact portions of the device 80 for electrical contact. To allow a compensation of tolerances and thermal expansions, the device contact terminal portions 61*a*3 provide a meander shape with meanders deflecting partially away and towards the main direction. The meanders thereby allow a length compensation in the main direction. For example, with the device contact terminal portions configured to compensate for tolerances, the device contact terminal portions 61*a*3 may provide in the main direction equal to an expected maximum distance between the device 80 and the mold portion 61*a*1, when assembled, due to tolerances. Accordingly, even if the distance is smaller within the applicable range of tolerances, the meanders allow the device contact terminal portion 61*a*3 to be compressed without applying significant pressure on the device 80 or breakage. The ability of the device contact terminal portion 61*a*3 to be compressed in the main direction also allows to compensate for thermal expansions in the main direction.

The invention has been described in with respect to exemplary embodiments. However, the invention is not limited to the exemplary embodiments. In particular, even though the exemplary embodiments show an assembly of terminal connectors 21, 31, 41, 51, 61, 62, 63 in terminal connector frames 20, 30, 40, 50, 60 at least some of the terminal connectors 21, 31, 41, 51, 61, 62, 63 may be integrally formed with respective terminal connector frames 20, 30, 40, 50, 60, e.g. by injection molding or over molding of a respective assembly, to be directly connected to the connector frame 10 in a respective connector frame opening 11, 12. Additionally, the connector assembly is described with respect to configuration comprising the device 80 and other components. However, the connector assembly may also be represented by the connector strip assembly 1 only as a pre-assembled module.

THE LIST OF REFERENCE SIGNS IS AS FOLLOWS

1 connector strip assembly
10 connector frame

11 first connector frame opening
12 second connector frame opening
13 oblong hole
14 pressure relief member
15 sealing member
20 terminal connector frame
21 terminal connector
30 terminal connector frame
31 terminal connector
40 terminal connector frame
41 terminal connector
50 terminal connector frame
51 terminal connector
60 terminal connector frame
61 terminal connector
61*a* terminal assembly
61*a*1 mold portion
61*a*2 electric terminal
61*a*3 device contact terminal portion
62 terminal connector
63 terminal connector
71 counter-connector
71*a*, 71*b* counter-connector socket
72 counter-connector
73 counter-connector
80 printed circuit board (device)
81 screw
90 housing
90*a* top cover
90*b* connector housing
100 connector assembly
l1 length (connector frame opening 11)
l2 length (connector frame opening 12)
L longitudinal direction

What is claimed is:

1. A connector assembly for an electric connection of a device in a connector-to-counter-connector configuration, comprising:

at least one connector frame each having at least one connector frame opening, wherein each connector frame opening is configured to receive at least one terminal connector frame and/or at least one terminal connector by a form-fit connection and/or force-fit connection by the at least one connector frame including form-fit and/or force-fit arrangement at or near the at least one connector frame opening;

wherein at least one of:

(i) the at least one terminal connector frame has at least one terminal connector and/or at least one terminal connector frame opening configured to receive the at least one terminal connector by a form-fit connection and/or a force-fit connection, and/or (ii) the at least one terminal connector includes at least one connection member to connect the terminal connector to a connector frame of the at least one connector frame by a form-fit or force-fit connection or to the terminal connector frame by a form-fit and/or force-fit connection, wherein the at least one terminal connector frame and/or the at least one terminal connector is received in a connector frame opening of the least one connector frame opening by a the form-fit and/or force-fit connection, the connector frame opening being closed in a longitudinal direction as a largest extension of the connector frame opening in a frame plane as a length of the connector frame opening, wherein the connector frame opening is closed by selectively receiving one or more arrangements, the one or more arrangements being selected from the following arrangements:

(i) the terminal connector frame including more than one terminal connector and/or more than one terminal connector frame opening, (ii) a plurality of terminal connector frames of the at least one terminal connector frame, the plurality of terminal connector frames being received adjacent to each other in the longitudinal direction, (iii) at least one terminal connector frame of the at least one terminal connector frame, and a filler plate or a filler plug, wherein the filler plate or filler plug is configured like the terminal connector frame without a terminal connector but with a closed surface or the filler plate or filler plug is configured to close at least one of the more than one terminal connector frame opening.

2. The connector assembly of claim 1, wherein at least one of the at least one connector frame includes at least two connector frame openings, each of which provides a largest extension of the opening in the frame plane as length, and wherein the at least two connector frame openings are arranged in parallel to each other with their respective lengths at least partially facing each other.

3. The connector assembly of claim 1, wherein each of the at least one connector frame includes at least one oblong hole configured such that the connector frame is attachable to the device and such that a relative position of the connector frame is adjustable with respect to the device.

4. The connector assembly of claim 1, wherein each of the at least one connector frame includes at least one pressure relief member.

5. The connector assembly of claim 4, wherein each of the at least one connector frame includes at least one sealing member enclosing the at least one connector frame opening and/or the at least one pressure relief member.

6. The connector assembly of claim 1, wherein the connector assembly includes the device electrically connected to a counter-connector, and wherein the connector frame is attached to the device, which may be by at least one screw passing through at least one oblong hole of the connector frame and the device, with at least one device contact terminal portion of an electric terminal provided by the at least one terminal connector or the at least one terminal connector frame being in contact with an electric contact of the device by such attachment.

7. The connector assembly of claim 1, wherein each of the at least one terminal connector includes a plurality of electric terminals, each electric terminal of the electric terminals configured to electrically connect at least one counter-connector of another device in a connector-to-counter connector arrangement.

8. The connector assembly of claim 7, wherein each of the at least one terminal connector includes at least one mold portion with the plurality of electric terminals molded in the mold portion.

9. The connector assembly of claim 8, wherein each of the plurality of electric terminals of each of the at least one terminal connector includes an exposed end configured to be in contact with an electric contact of the device, each exposed end having at least two turning points to deflect the extension of the electric terminal at least once from a main direction, in which the electric terminal extends in a contact direction.

* * * * *